United States Patent
Räisänen et al.

(10) Patent No.: US 7,835,283 B2
(45) Date of Patent: Nov. 16, 2010

(54) METHOD AND SYSTEM FOR MANAGING QUALITY OF SERVICE BY FEEDING INFORMATION INTO THE PACKET NETWORK

(75) Inventors: Vilho Räisänen, Helsinki (FI); Marko Suoknuuti, Espoo (FI); Pekka Pessi, Helsinki (FI)

(73) Assignee: Nokia Corporation, Espoo (FI)

( * ) Notice: Subject to any disclaimer, the term of this patent is extended or adjusted under 35 U.S.C. 154(b) by 1277 days.

(21) Appl. No.: 10/312,697

(22) PCT Filed: May 2, 2001

(86) PCT No.: PCT/FI01/00418

§ 371 (c)(1),
(2), (4) Date: Apr. 2, 2003

(87) PCT Pub. No.: WO02/07394

PCT Pub. Date: Jan. 24, 2002

(65) Prior Publication Data

US 2003/0152028 A1 Aug. 14, 2003

(30) Foreign Application Priority Data

Jun. 30, 2000 (FI) .................................. 20001578

(51) Int. Cl.
*G01R 31/08* (2006.01)
(52) U.S. Cl. ....................... 370/235; 370/254; 370/352; 370/395.31
(58) Field of Classification Search ................ 370/235, 370/352, 395.31, 468, 230, 351, 467, 236, 370/236.1, 239
See application file for complete search history.

(56) References Cited

U.S. PATENT DOCUMENTS

| 5,742,772 | A | * | 4/1998 | Sreenan ...................... 709/226 |
| 6,069,876 | A | * | 5/2000 | Lander et al. ............... 370/249 |
| 6,091,709 | A | | 7/2000 | Harrison et al. |
| 6,272,131 | B1 | * | 8/2001 | Ofek .......................... 370/389 |

(Continued)

FOREIGN PATENT DOCUMENTS

EP 0 786 883 7/1997

(Continued)

OTHER PUBLICATIONS

Asawa, M, Measuring and analyzing service levels: a scalable passive approach, 1998, pp. 3-12, IEEE.*

(Continued)

*Primary Examiner*—Ayaz R Sheikh
*Assistant Examiner*—Mounir Moutaouakil
(74) *Attorney, Agent, or Firm*—Mintz, Levin, Cohn, Ferris, Glovsky and Popeo, P.C.

(57) ABSTRACT

The invention relates to a method for managing Quality of Service (QoS) in a packet network (10). The method comprises feeding a predetermined information flow into the packet network. (10) for measurement purposes and measuring the characteristics of said information flow by means of a continual measurement for producing QoS information. Said Qos information is used to control communications traffic in the packet network (10) in order to manage the Quality of Service (QoS) of the packet network (10). The invention further relates to a system for managing Quality of Service (QoS) in the packet network (10).

22 Claims, 7 Drawing Sheets

U.S. PATENT DOCUMENTS

| | | | |
|---|---|---|---|
| 6,496,477 B1* | 12/2002 | Perkins et al. | 370/228 |
| 6,496,479 B1* | 12/2002 | Shionozaki | 370/230 |
| 6,574,213 B1* | 6/2003 | Anandakumar et al. | 370/349 |
| 6,614,781 B1* | 9/2003 | Elliott et al. | 370/352 |
| 6,633,540 B1* | 10/2003 | Raisanen et al. | 370/230.1 |
| 6,731,625 B1* | 5/2004 | Eastep et al. | 370/352 |
| 6,731,627 B1* | 5/2004 | Gupta et al. | 370/352 |
| 6,769,024 B1* | 7/2004 | Natarajan et al. | 709/224 |
| 6,973,042 B1* | 12/2005 | Fitzgerald | 370/249 |
| 2002/0044528 A1* | 4/2002 | Pogrebinsky et al. | 370/230 |
| 2003/0202506 A1* | 10/2003 | Perkins et al. | 370/352 |

FOREIGN PATENT DOCUMENTS

| | | |
|---|---|---|
| FI | 20000316 | 2/2000 |
| WO | 99/11094 | 3/1999 |
| WO | 0 932 289 | 7/1999 |
| WO | 00/35130 | 6/2000 |

OTHER PUBLICATIONS

Dapeng Wu et al., "On implementation Architecture for Achieving QoS Provisioning in Integrated Services Networks", 1999 IEDEE International Conference on Communications 1999. ICC '99, vol. 1, Jun. 6-10, 1999, pp. 461-468, XP002901843, Brooklyn, NY, USA, Chapter 3.1, first part.

Harju, J. et al., "Measurements About the Quality of Controlled-Load Service," 1999 IEEE Intenrational Conference on Communications 1999. ICC '99, vol. 2, Jun. 6-10, 1999, pp. 739-743, XP002901844, Tampere Finland, p. 740, chapter measurements, first and second part.

Elek, V et al., "Admission Control Based on Ent-to-End Measurements," INFOCOM 2000, Nineteenth Annual Joint Conference of the IEEE Computer and Commnications Societes. Proceedings. IEEE, vol. 2, Mar. 26-30, 2000, pp. 623-630, XP002901842, Kista, Swedent, p. 624, chapter 2, part B & C.

Räisänen, V.I., et al., "Application-Level IP Measurements for Mutlimedia," Eighth International Workshop in Quality of Service, IWQOS 2000, Jun. 5-7, 2000, pp. 170-172, XP002901841, Espoo Finland, p. 170, col. 2, lines 13-36.

U.S. Appl. No. 09/346,747, filed Jul. 2, 1999, Räisänen et al.

* cited by examiner

METHOD AND SYSTEM FOR MANAGING QUALITY OF SERVICE BY FEEDING INFORMATION INTO THE PACKET NETWORK

The present invention relates to Quality of Service management in a packet-switched communications network, particularly in a communications network based on the Internet Protocol (IP).

In conventional telephone calls, speech is transmitted in circuit-switched networks, such as the Public Switched Telephone Network (PSTN). When calls are made in a digital circuit-switched network, a fixed connection of 64 kbps is formed for each call. The standard bandwidth, 64 kbps, is determined by the bit rate needed in the sampling of analogue speech when 8-bit Pulse Code Modulation (PCM) is used at a sampling frequency of 8 kHz, which allows analogue speech having a frequency band of 300-3400 Hz to be transmitted in a digital form.

The above described, currently widely used digital telephone network is, however, most inefficient and consumes network resources excessively, The band reserved for the connection in the telephone network is occupied also when the connection is not used actively, i.e. neither of the parties participating in the connection is transmitting information, such as speech or data, over the connection. This kind static band use consumes a great deal of communications resources and therefore investment into additional capacity is needed to reflect the increasing numbers of users. The above described inefficiency causes problems particularly in inter-continental calls where it is not as simple to increase communications capacity as it may be otherwise. The problem appears also in call rates; heavy investment into capacity must be recovered by high use charges.

To replace and complement calls using static band reservation in the telephone network, marketing efforts are being aimed at what are known as VoIP calls (Voice over Internet Protocol). In VoIP calls the information to be sent, such as speech or audio, is typically first converted from an analogue to a digital form, then compressed and converted into IP packets, which are transferred over a packet-switched IP-based network, such as the Internet, on a frequency band shared with other IP traffic. VoIP calls allow for a significantly more effective use of the frequency band than calls employing static band reservation, which is reflected in call rates as well. In addition, new, more efficient coding schemes are also available, such as G.723.1. If the information to be transmitted contains not only audio but also visual information, such as video, the call is not referred to as a VoIP call, but as a Multimedia over IP call. In this context, a VoIP call and a Multimedia over IP call will both be referred to as IP calls.

Information transmitted in the IP network can be roughly divided into real-time information and non-real-time information. Applications (such as VoIP and Multimedia over IP applications) used for transmitting and reproducing real-time information in particular are subject to strict real-time requirements (short end-to-end delay, for example) to ensure proper operation. Therefore, an arrangement is usually required to guarantee a desired Quality of Service level for an IP call transmitting real-time information, Non-real-time traffic flow is often referred to as best-effort traffic. Since best-effort traffic is usually not subjected to strict real-time requirements (such as short delays, low jitter in the delay), the network offers the traffic Quality of Service that is available at a time. For example, no standard bandwidth is usually guaranteed for best-effort traffic. File Transfer Protocol (FTP) data traffic, for example, is a traffic type for which best-effort transmission can often be considered sufficient.

To describe Quality of Service, various Quality of Service parameters are usually required, such as bandwidth, end-to-end delay, end-to-end delay jitter, packet loss and packet loss correlation. End-to-end delay is the time it takes for an IP packet to travel through the IP network from the sender to the recipient. End-to-end delay jitter may be expressed for example in the form of standard deviation or as variance. Packet loss indicates the number of packets not received at the receiving end, i.e. the number of packets lost on the way. For the system performance it is highly significant whether IP packets are lost every now and then (no packet loss correlation) or whether several successive packets are lost (high packet loss correlation). Guaranteed QoS means, for example, that it can be mathematically shown that the network is capable of transmitting packets so that the delay, as well as packet loss, always remains under a predetermined maximum limit.

The IP protocol does not support Quality of Service in the sense that it would offer guaranteed Quality of Service. There are, however, various techniques aiming at providing guaranteed Quality of Service in the IP network. These techniques include IntServ (Integrated Services) and DiffServ (Differentiated Services), for instance, IntServ provides guaranteed Quality of Service, but due to its complexity it is not scalable to large networks. DiffServ, in turn, prioritizes the traffic into classes, but it cannot offer guaranteed QoS in all situations.

The present invention provides a new solution for Quality of Service management in a packet network. A method for managing Quality of Service in a packet network is implemented according to a first aspect of the invention. The method is characterized in that the method comprises the steps of feeding a predetermined information flow into the packet network for purpose of measurement;

measuring the characteristics of said information flow in a continual measurement for producing QoS information; and controlling communications traffic in the packet network on the basis of said QoS information in order to manage the Quality of Service (QoS) in the packet network.

A system according to a second aspect of the invention is provided to manage Quality of Service in a packet network, the packet network comprising means for transferring information in a packet format.

The system is characterized in that the system comprises means for feeding a predetermined information flow into the packet network for purpose of measurement;

means for measuring the characteristics of said information flow by using a continual measurement for producing QoS information; and means for controlling communications traffic in the packet network on the basis of said QoS information to manage the Quality of Service of the packet network.

In this specification, the term IP network is used not only for networks based on the IP protocol, such as Internet and Intranet networks, but also for other similar kind of packet networks, such as the X.25 network. An IP call refers to a call where information, preferably speech, voice (VoIP), image, video and/or multimedia (Multimedia over IP) is transferred over this kind of network usually for providing a real-time service. The invention is thus also applicable in video-conferencing.

The invention aims at maintaining a constant QoS level for real-time traffic transmitted in the packet network. In addition, the invention aims at guaranteeing a predetermined minimum bandwidth for best-effort traffic transmitted in the packet network.

In the following the invention will be described in greater detail with reference to the accompanying drawings, in which FIG. 1 illustrates an architecture of a Quality of Service management system according to the invention;

Figure 1:
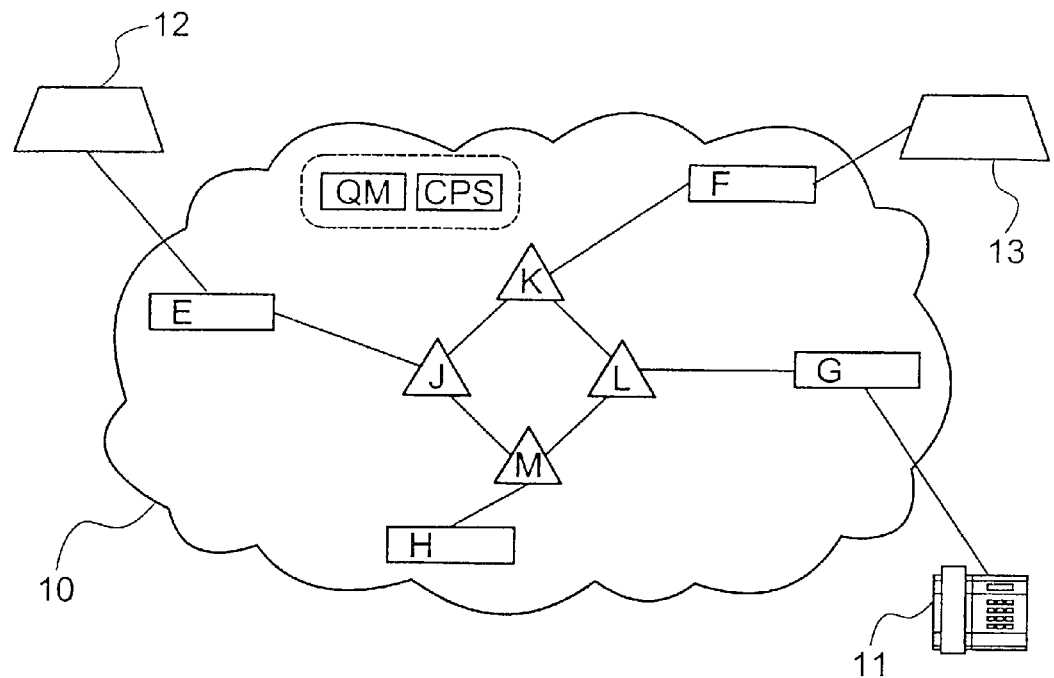

FIG. 1 shows the architecture of the QoS management system according to the invention in an IP network. The system comprises access nodes, indicated in FIG. 1 with references E, F, G and H. Through these access nodes, VoIP packets, i.e. packets generated by a VoIP application, can access the IP network 10. The access node may be for example an access router or a VoIP gateway. The latter usually converts a voice signal into IP packets, or vice versa. In addition, the system comprises an IP core network and core routers located in the network, the routers being indicated in FIG. 1 with references J, K, L and M. The system further comprises a call processing server CPS and a QoS manager QM located in the IP network 10.

The access node E, F, G, H is usually located at the edge of the IP network domain 10 concerned. The terminal, such as a telephone 11 or a computer 12, 13, which may include multimedia characteristics, may access the IP network through one of the access nodes. The access node comprises a traffic shaper known from U.S. patent application Ser. No. 09/346, 747 (tiled on Jul. 2, 1999). Priority of the U.S. application concerned is claimed for an international PCT application of the same Applicant which will be referred to herein with regard to the implementation of the traffic shaper.

The traffic shaper may be an algorithm integrated into the operating system of the access node. When the algorithm is being carried out, the traffic shaper shapes real-time traffic on the basis of traffic shaping parameters, providing at the same time non-real-time best-effort traffic with a keep-alive bandwidth that is needed for keeping alive the traffic connection.

The core network router J, K, L, M is located in the IP core network. It relays the IP packets it receives further to the following core router or to the access node E, F, G, H.

The call processing server CPS uses the QoS manager QM to centrally process call set-up requests, for an IP call for example, arriving from the terminals 11-13. The CPS is capable of exchanging signalling messages with the terminal by using H.323 or SIP protocol (Session Initiation Protocol), for example.

One of the functions of the QM is to monitor changing QoS circumstances in the IP network, for example by collecting measurement data on the QoS values of the IP network. The QM maintains up-to-date information about the QoS situation of the IP network in its QoS database and carries out operations associated with the QoS management of the IP network. Although in FIG. 1 the CPS and the QM are arranged into one and the same host apparatus, they may be alternatively located in different hosts.

In the following, we shall describe a process according to the invention for collecting real-time, or at least almost real-time, QoS information to assist the QM and the CPS in their decision-making. The measurement system in question for obtaining QoS information about the IP network is shown in FIG. 2.

Figure 2:
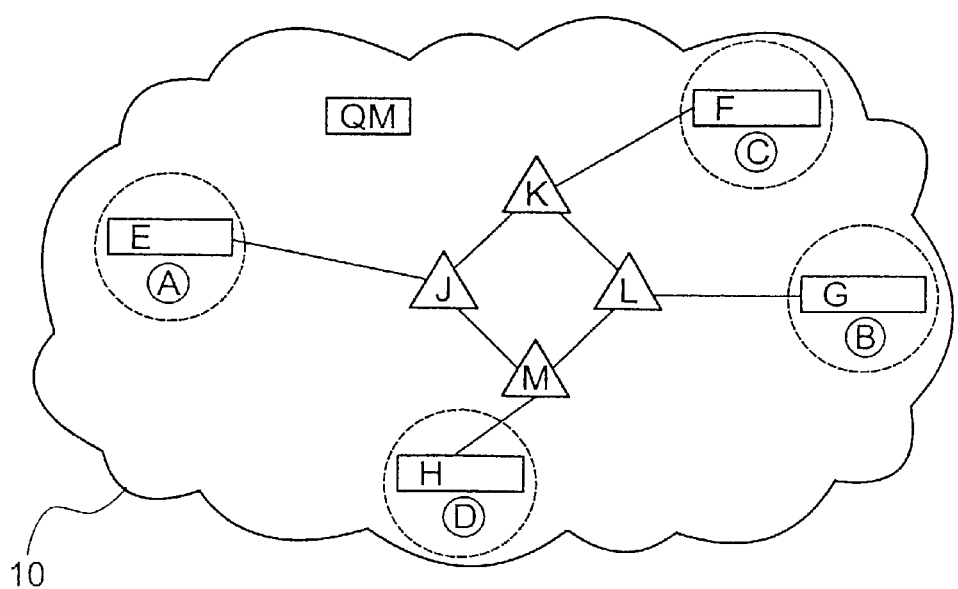
FIG. 2 illustrates a measurement architecture according to the invention for collecting real-time QoS information.

Compared with FIG. 1, FIG. 2 introduces a new, central element, i.e. measuring hosts A, C, B, D. They can be either integrated into the access nodes E, F, G, H, or separate elements capable of measuring the QoS experienced by a (Vo)IP packet flow propagating on a specific route, relayed by their respective access node. If the measuring host is implemented as a separate element, it may be located in the core network, adjacent to the access node, or completely outside the IP network domain 10 in question. Alternatively, the measurement function may be located for example in an access node (in the access router or the VoIP gateway).

Finnish Patent Application FI 20000316 discloses a method for emulating the bi-directional information flow of a real-time application and for making discrete QoS measurements. Although the measurement system of the present invention is based on continual measurements and not discrete ones, for example the basic principles disclosed in the Finnish patent application can be applied in the system.

Figure 3:
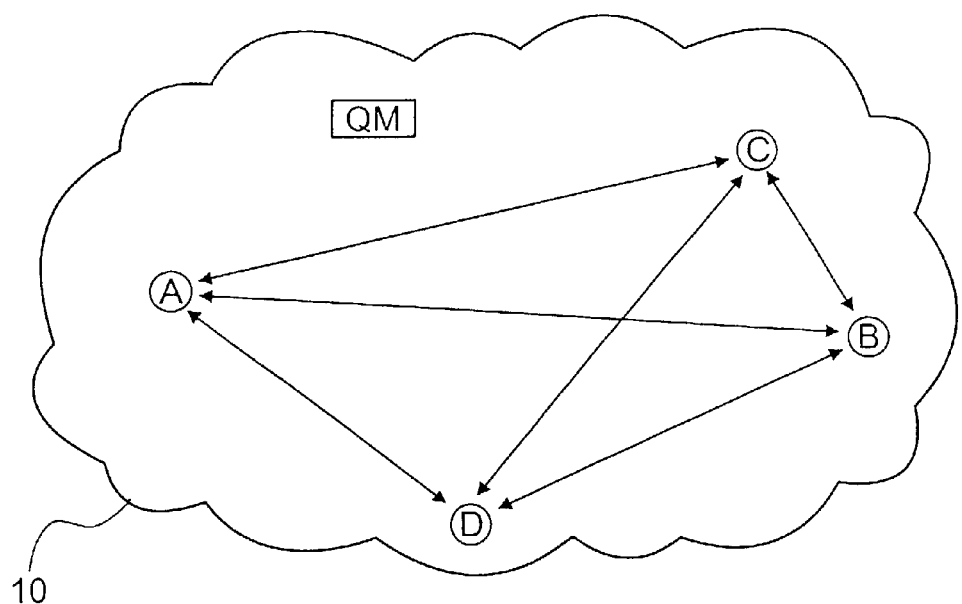
FIG. 3 illustrates measuring host apparatus pairs.

The measurement system shown in FIG. 2 carries out continual VoIP application level measurements according to host pairs (FIG. 3). In FIG. 3 the measuring host pair is formed by hosts A and B, A and C, A and D, B and C, B and D, and C and D. The measurements are carried out according to a measurement profile drawn up in advance by the QM. Before the measurement is started, the QM configures the measuring hosts, thereby ensuring that the hosts function according to the measurement profile. The QM performs the configuring of the hosts using an appropriate protocol, such as H.248/Megaco.

The measurement profile determines for example the QoS parameters (such as delay, jitter, packet loss, packet loss correlation, bandwidth) the values of which the measuring host A, C, B, D is to calculate and how it will deliver the results to the QM. The measuring host may transmit the measurement results to the QM periodically, at intervals of 30 seconds, for example. Another alternative is that the measurement profile comprises warning and alert levels set for the QoS parameters and that only cases where the warning and alert level is exceeded/not reached are reported to the QM. For example, the QM may provide an end-to-end delay with warning and alert levels of 15 ms and 25 ms, respectively. Naturally any combination of the above measures related to the reporting of the measurement results can also be used.

Figure 4:
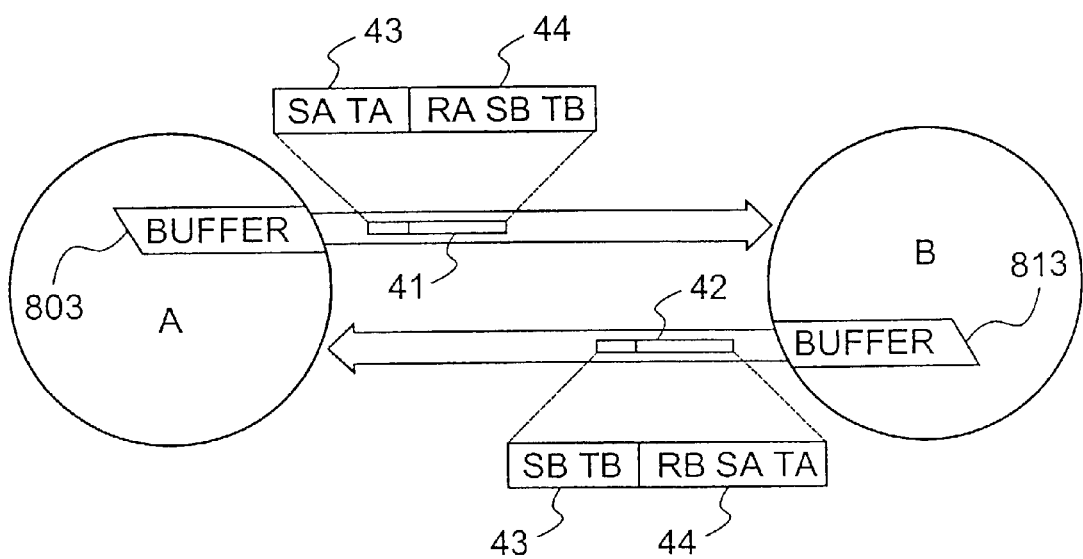
FIG. 4 illustrates a QoS measurement system according to the invention.

We shall now concentrate on one measuring host pair (FIG. 4) formed by measuring host A and measuring host B. Measuring hosts A and B exchange IP test packets according to the measurement plan drawn up by the QM. The IP test packets are preferably sent by using an UDP protocol over the IP protocol. The transmitted IP test packets emulate the bi-directional flow of IP packets in a real IP call from one network node to another (in this case from network node E to network node G). Hosts A and B are preferably integrated with their respective access nodes E and G, whereby the IP test packets to be transmitted are automatically conveyed through access nodes E and G and thus the QoS experienced by the IP packet flow generated by the real-time application (and, thus, the QoS experienced by the real-time application itself), such as the VoIP application, can be determined on the connection between the access nodes E and G in the IP network.

In the measurement system according to the invention, transmission of IP test packets is continual of its nature. Transmission taking place according to the measurement profile may be piecewise continual, i.e. intermittent, instead of a fully continuous transmission. In that case there may be pauses between continual-like measurement periods. The interval at which the IP test packets are to be transmitted and the size of the packets conform to the transmission interval and packet size applied by a real codec, such as G.723.1. In this context, real codec refers to a speech codec or a video codec, for example. The measurement profile indicates the codec whose IP packet flow is to be emulated. The emulating of the IP packet flow generated by a real codec is useful because it allows more realistic QoS measurement results to be obtained.

If the IP network that is subject to the QoS measurement employs a technique which allows alternative routes to be defined between measuring hosts A and B (between access nodes E and G), the measurements can be made, for the sake of comparison, on a plurality of routes between the two measuring hosts. Multi Protocol Label Switching (MPLS) is an example of such a technique. In the example shown in FIG. 2, there are two alternative routes between access nodes E and G, one of which goes through IP core network routers J, K and L and the other through IP core network routers J, M and L.

Each IP test packet 41, 42 (FIG. 4) comprises an IP header 43 and payload 44. It is apparent to a person skilled in the art that an IP test packet may also comprise other fields not shown in FIG. 4. Let us now examine the IP test packet sent by measuring host A to measuring host B at the beginning of the QoS measurement. Measuring host A stores a sequence number SA of the IP test packet into the header 43 and, just before it sends the IP test packet, it stores a time stamp TA into the header of the IP test packet and sends the IP test packet 41 to host B. Host A stores the values of parameters SA and TA also into its memory for later analysis of the QoS parameters.

After having received the IP test packet 41 from host A, host B returns it to host A. However, received IP test packets are not returned to host A immediately, but the data they contain is stored into a buffer 813 in host B and then sent back from the buffer to host A, in the order of arrival, in a similar uniform IP packet flow as is formed by a real codec used in an IP call. This allows asymmetry to be removed during the QoS measurement; asymmetry would otherwise distort the QoS measurement, because it is not typically present in a real IP call. When receiving the IP test packet 41 sent by host A, host B stores a tuple into its buffer 813, the tuple comprising the time of receipt RB of the IP test packet 41 and the sequence number SA and the time stamp TA given in the header 43 of the IP test packet. The host stores the values of parameters RB, SA, TA also into its memory for later analysis of the QoS parameters.

In due time an IP test packet 42 is sent from the buffer 813 of host B to host A. Host B stores a sequence number SB of the IP test packet into the header 43 of the IP test packet and, just before it sends the IP test packet, it stores a time stamp TB of the time of transmission of the IP test packet 42 into the header. Host B stores the values of parameters SB and TB also into its memory for later analysis of the QoS parameters.

Before sending the IP test packet 42, host B removes from the buffer 813 the tuple (RB, SA, TA) that is first in the line for transmission and stores it into the payload 44 of the IP test packet, if there are no tuples in the buffer 813 waiting to be sent, dummy payload is added to the payload 44 to make the payload equal in length with the payload sent by a real codec. The dummy payload can be marked for example with a marker bit to show the recipient of the IP test packet that the RB, SA and TA values in payload 44 are not real.

Similarly as in the description regarding host B, when host A receives the IP test packet 42, it stores into its buffer 803 a tuple which comprises the time of reception RA and the sequence number SB of the IP test packet 42, and a time stamp TB. Host A reads the sequence number SB and the time stamp TB from the header 43 of the IP test packet 42 it has received. The host stores the values of parameters RA, SB and TB also into its memory for later analysis of the QoS parameters. In addition, host A stores the RB, SA and TA information included in the payload 44 into its memory for later analysis of the QoS measurement results. The parameter values included in the payload 44 are not stored into the transmission buffer 803, Consequently, a two-way end-to-end delay d can now be calculated in host A using the following formula $$d=(RA-TA)-(TB-RB)$$

as shown in Patent Application Fl 20000316.

In due time an IP test packet 41 is again sent from host A to host B. Host A enters the sequence number SA of the IP test packet and, when it starts to send the IP test packet 41, the time stamp TA of the transmission time of the test packet into the header 43 of the IP test packet. Host A removes from the buffer 803 the tuple (RA, SB, TB) that is first in line for transmission and adds it to the payload 44 of the IP test packet 41 to be transmitted. Host A stores the parameters in question also into its memory for later analysis of the QoS measurement results.

When host B receives the IP test packet, it stores into its buffer a tuple 813 which comprises the time of reception RB of the IP test packet 41, as well as its sequence number SA and time stamp TA. Host B reads the sequence number SA and time stamp TA from the header 43 of the IP test packet it has received. The RA, SB and TB information included in the payload 44 is stored by host B into its memory for analysis of the QoS measurement results. The parameter values included in the payload are not stored into the transmission buffer 813. The continual measurement then proceeds according to the measurement profile, similarly as described above.

The sequence number SA, SB can be an integer, for example, that can be increased by one, for example, between consecutive transmissions. The time stamps TA, TB, RA, RB are determined by the measuring hosts on the basis of their clocks. If the clocks of hosts A and B are synchronized, also one-way delays can be calculated using the following formulas: $d_{A->B}$=RB−TA (delay from host A to host B) and $d_{B->A}$=RA−TB (delay from host B to host A). The clocks of the hosts can be synchronized using for example the Global Positioning System (GPS).

Data for calculating the end-to-end delay is obtained for example by calculating the differences between the time stamps of successive IP test packets received by one and the same host. On the basis of the differences, it is possible to calculate for example the standard deviation and/or variance of the end-to-end delay.

Packet loss and packet loss correlation can be studied by examining the sequence numbers SA, SB of the IP test packets received by the host to see which sequence numbers are missing.

The measuring hosts both need to be provided with a buffer, because the IP test packets sent from one host to another may arrive at the receiving end in a bursty manner. Burstiness means that the IP test packet flow received by the host is not uniform but comprises periods where packets are densely together (clusters of IP test packets) and periods where they are scattered (there is an exceptionally long delay between the packets). In such case buffering allows the IP test packets to be returned to have the transmission interval restored similar to what is applied by a real codec.

Measuring hosts A and B calculate the QoS parameter values on the basis of the values of the parameters (SA, SB, TA, TB, RA, RB) they have stored into their memories. As stated above, the measurement profile indicates the QoS parameter values that the measuring host is to calculate and how the results are to be delivered to the QM. The transmission may be carried out using the H.248 protocol or a similar suitable signalling protocol. The QM stores the QoS parameter values calculated by the host pairs into the QoS database it maintains.

If certain conditions are met in the network, the QM or the measuring host itself may initiate additional measurements or pause the measurements for a predetermined period according to the measurement profile. This way measurements do not have to be made all the time on all routes of the IP network, but the QM may interrupt the measurement on predetermined one or more routes between the hosts according to the measurement profile.

We shall, in the following, discuss the measures of the invention that the QM and the CPS are to carry out with regard to QoS management in the IP network after real-time QoS information relating to the IP network has been collected in the above described manner to support the decision-making of the QM and the CPS.

Since the QM continuously receives real-time application-level information from the measuring hosts A, C, B, D on the QoS parameters of the routes between the access nodes E, F, G, H of the IP network 10, the QM is capable of monitoring the changing QoS conditions of the IP network. The access nodes comprise a traffic shaper, the parameters of which the QM can change in a centralized manner. The traffic shaper parameters include guaranteed bandwidth for real-time traffic, real-time traffic delay and guaranteed bandwidth for best-effort traffic. This means that if desired, best-effort traffic can be provided with guaranteed minimum bandwidth for example in a situation where both real-time and best-effort traffic is relayed through one and the same access node. The access node controls the traffic accepted into the IP network on the basis of the traffic shaper parameters. The parameter values of the traffic shaper may be for example the following: guaranteed bandwidth of 1 Mbit/s for real-time traffic, a maximum real-time traffic delay of 50 ms and a guaranteed bandwidth of 256 kbit/s for best-effort traffic. As regards real-time traffic, the bandwidth of 1 Mbit/s guaranteed in the traffic shaper can be divided for example among a plural number of IP calls.

Figure 5:
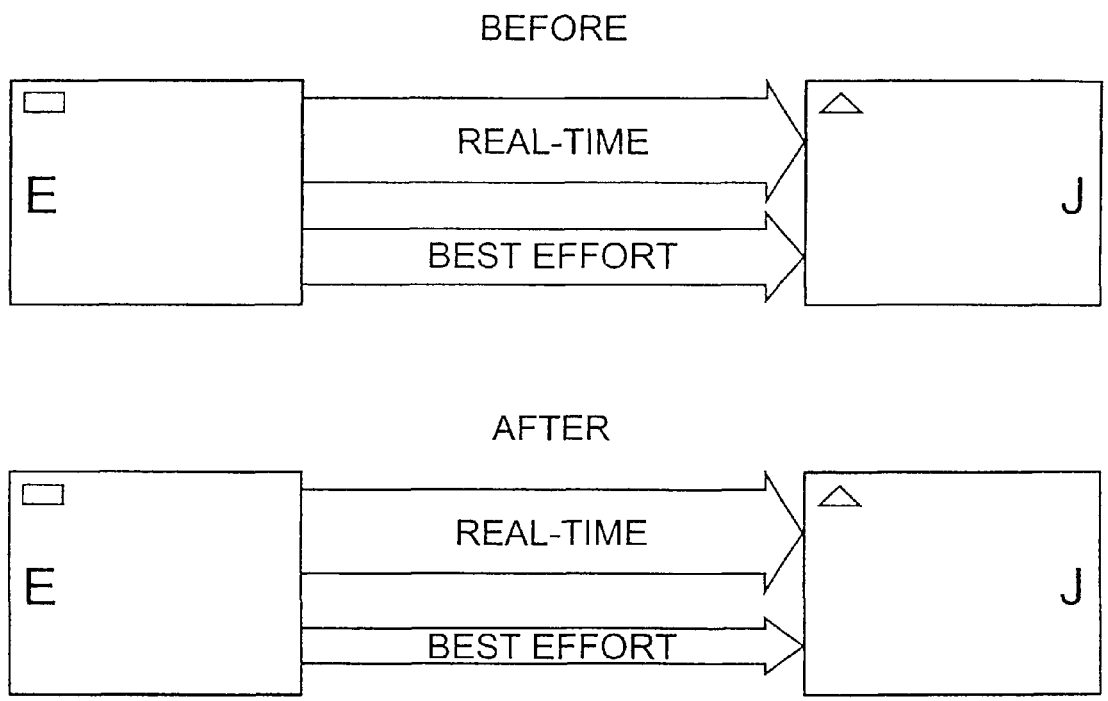
FIG. 5 illustrates one way of improving the network's QoS situation.

If the measurements show for example that the QoS situation in the IP network suddenly deteriorates (the delay increases, for example), the QM can restrict the amount (bandwidth) of data traffic entering the IP network. The QM may carry this out by changing the parameter values of the traffic shaper of the access node for example by reducing the guaranteed bandwidth of best-effort traffic to 128 kbit/s. However, the guaranteed bandwidth of real-time traffic should not be changed during an IP call because that might have radical effects on the IP call itself. FIG. 5 illustrates real-time traffic and best-effort traffic taking place through the access node to the IP network before and after the traffic shaper parameters are changed. The node on the left in the Figure is access node E (FIG. 1) and the node on the right is router J of the IP core network. Access node E relays both real-time traffic and best-effort traffic from outside the IP network 10 into the IP network. Comparison of the upper case (situation BEFORE the parameters are changed) shown in FIG. 5 with the lower one (situation AFTER the change) shows that the predetermined bandwidth of the best-effort traffic originally relayed by the access node (situation BEFORE) has been restricted due to a deteriorated QoS level (situation AFTER). This way, when the QoS level drops, it is possible to improve the quality of service offered by the network to the real-time traffic by reducing the bandwidth of the best-effort traffic.

The invention also includes the possibility for the measuring host to directly change one of the traffic shaper parameters (such as the guaranteed bandwidth of the best-effort traffic) of an edge router according to the measurement profile without the intervention of the QM.

Figure 6:
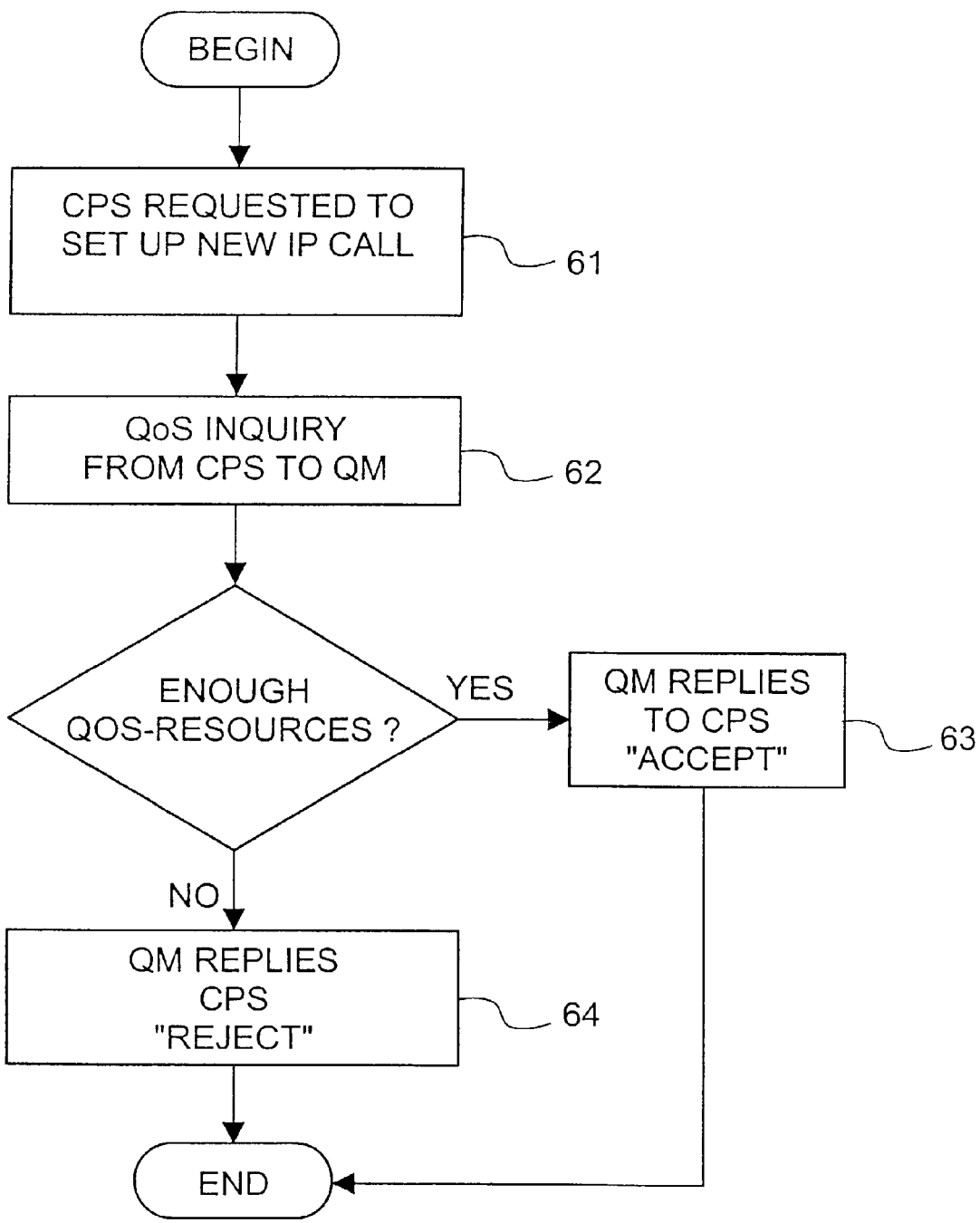
FIG. 6 is a flow chart illustrating an IP call set-up process of the invention.

We shall now describe, with reference to the flow chart presented in FIG. 6, an example of how a set-up request for a new real-time connection is processed according to the invention in the CPS. The example also relates to FIG. 1.

In the initial state the terminal 12 sends the CPS a request, using the H.323 or SIP protocol, for example, for setting up (block 61) an IP call (real-time connection). The request must identify the recipient of the IP call and the QoS that is desired for the IP call. The example shown in FIG. 6 assumes that the recipient is a telephone 11 of the public telephone network (FIG. 1) Which is connected to the IP network through a VoIP gateway G. Consequently, if a decision was made to set up the requested IP call, the call would be relayed through access nodes E and G.

The terminal 12 (FIG. 1) may inform the desired QoS for the IP call in its request for example by listing maximum/minimum values for the different QoS parameters. The terminal 12 may for example list the maximum value of the delay acceptable for the IP call and the bandwidth needed by the call. After having received the request, the CPS asks the QM whether the IP network has enough QoS resources for providing the maximum/minimum QoS parameter values on the route (block 62) between access nodes E and G. To find out this, the OM carries out a calculation using the QoS data included in the QoS database. If the result of the calculation shows that the maximum/minimum QoS parameter values can be provided, the QM advises the CPS to accept the IP call set-up request sent by the terminal 12 (block 63). On the other hand, if the QoS needed by the IP call cannot be provided, the QM advises the CPS to reject the request (block 64).

If the CPS accepts the request for the IP connection set-up, it sends an acknowledgement to the terminal 12 that sent the request. The IP connection is set up between the connection parties 12, 11, and the terminal 12 may start to send IP packets (such as VoIP packets) to the telephone 11 through the IP network 10 and access nodes E and G, and vice versa.

If the CPS rejects the IP connection set-up request, the QM may reduce the bandwidth of the best-effort traffic on the route concerned to allow later real-time connection set-up requests to be accepted. The QM may reduce the bandwidth of the best-effort traffic by reducing the value assigned for the guaranteed best-effort traffic bandwidth in the traffic shaper parameters of the access node E, G concerned.

The MPLS is a technique which allows routes to be formed between IP core network routers. If the IP network employs the MPLS technique, or if it employs another technique that allows for stable per call routing, the QM may form, modify and release permanent routes between the core network routers. The CPS may then ask the QM to provide a route for an IP call it has accepted, thereby allowing all IP packets included in the same IP call to be transmitted from the sender to the recipient on the same route in the IP network.

Figure 7:
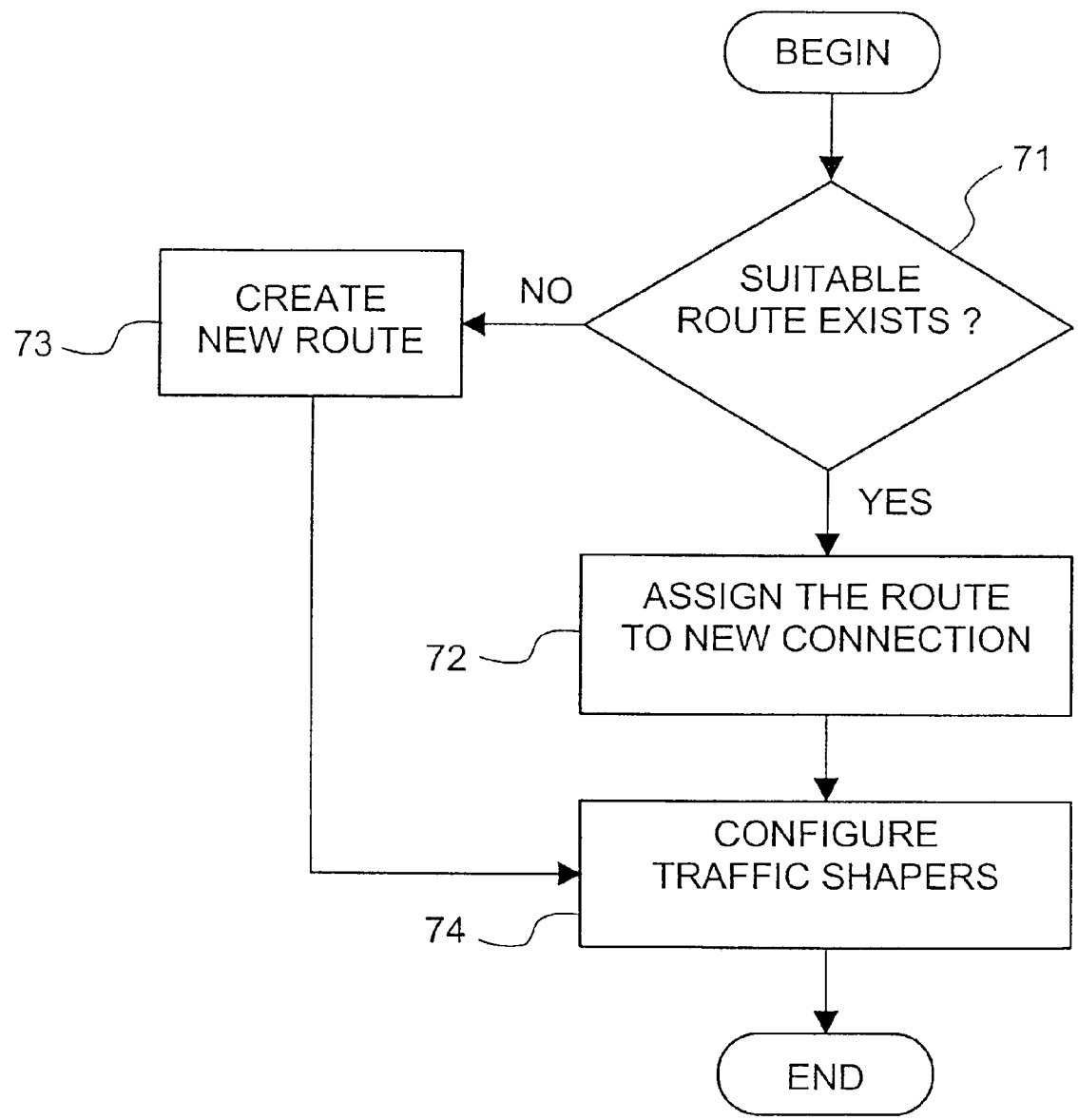
FIG. 7 is a flow chart illustrating how an IP call route is determined.

FIG. 7 is a flow chart illustrating how the QM determines the route in the architecture according to the invention. When the CPS requests the QM to provide a route for an IP call accepted by the CPS, the QM examines the information in its real-time QoS database to find out whether there already is a route between the access nodes in the IP core network that meets the QoS requirements of the IP call (block 71). For example, if the parties participating in the IP call accepted by the CPS are the terminal 12 and the telephone 11, an existing route is to be searched for between access nodes E and G. If a suitable route already exists (i.e. a route with suitable QoS parameters), the QM selects that route as the one to be used for transferring the IP packets between the parties of the IP call (block 72). It is to be noted that one and the same route can thus be used for transferring IP packets belonging to one or more connections.

If a suitable route does not exist, the QM forms a new route with suitable QoS parameters through the IP core network (block 73) The IP network typically contains some routes determined already in advance, a suitable one of these being then selected. For example, with reference to the symbols used in FIG. 1, if there are already too many connections on the route going through the routers J, K and L, an alternative route through the routers J, M and L for example, will be selected. After an existing route or a new one has been selected, the QM uses the MPLS technique to configure the access nodes E and G of the route in question as well as the IP core network routers J, K and L, or J, M and L (block 74).

After an existing route has been selected, or a new one formed, the QM informs the CPS accordingly. The CPS sends an acknowledgement to the terminal 12 that sent the IP connection set-up request. The terminal 12 may now start to send IP packets (for example IP packets generated by the VoIP application) to the recipient 11 of the IP call on the route selected for the call, and vice versa.

If the QoS situation on a route between two access nodes is such that the QoS capacity the network provides for the real-time traffic on the route in question is approaching its extreme limits, the QM may balance the QoS situation between the access nodes in question. To perform this, the QM re-routes some or all of the best-effort traffic taking place between the access nodes in question to an alternative route through the core network, thereby improving the QoS situation experienced by the real-time traffic on the original route.

When the QM configures the access node, a (maximum) bandwidth may be reserved for the IP packet flow of a specific real-time connection, the bandwidth corresponding to the bit rate of a predetermined codec. This allows any variation in bit rate caused by the burstiness in the IP packet flow coming from another IP network to be removed by buffering, for example, and the original bit rate value to be restored. In other words, when the IP packet flow of a single real-time connection is allocated a bandwidth that is exactly equal to the (maximum) bit rate of the codec used in the IP call concerned, the traffic shaper of the access node shapes the variation in the bit rate caused by the burstiness of the packet flow.

Figure 8:
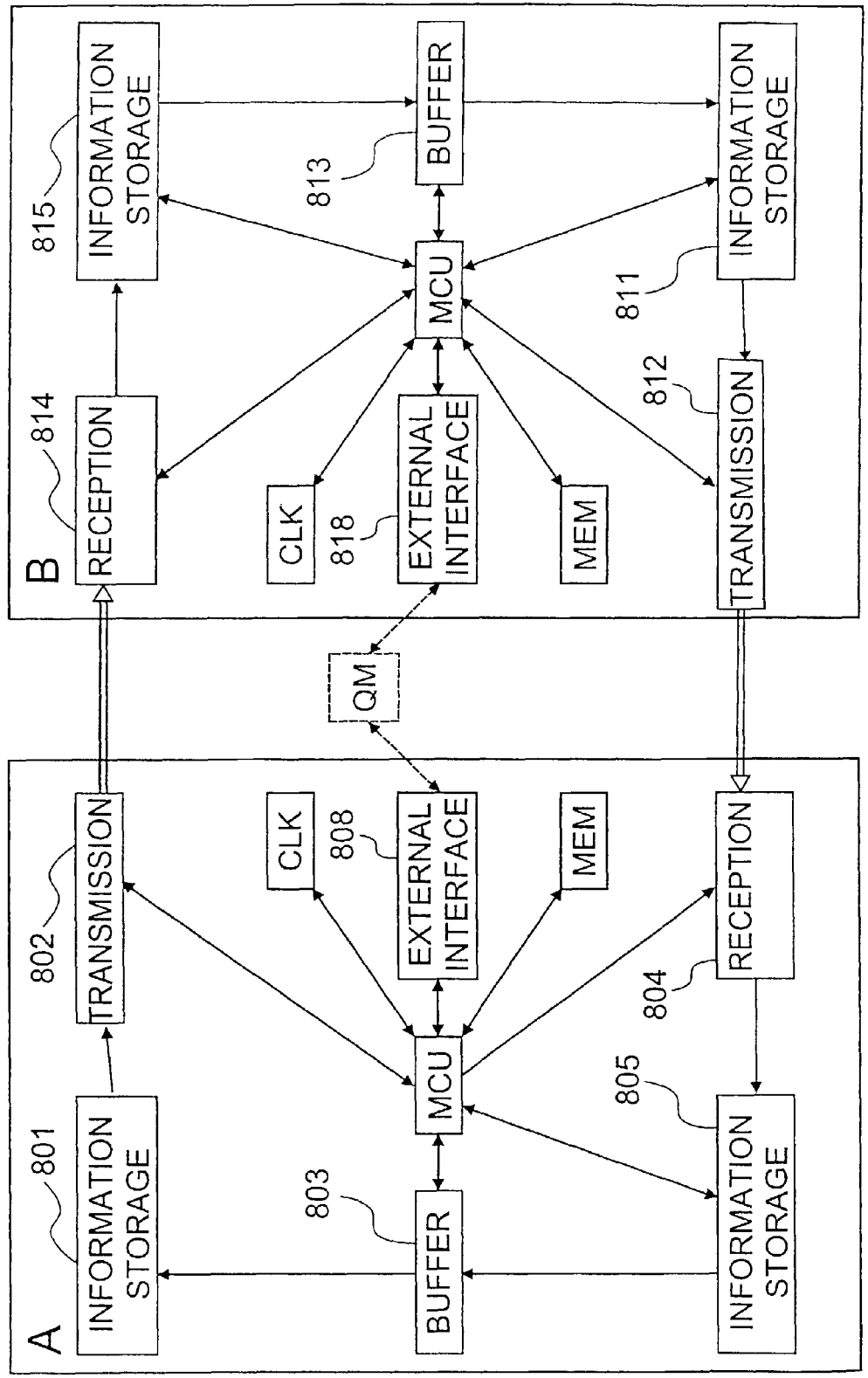
FIG. 8 is a block diagram illustrating the implementation of a measuring host apparatus pair.

The block diagram in FIG. 8 illustrates an implementation of the measuring host pair. The host pair comprises two measuring hosts: host A and host B. The hosts may be for example computers which can be connected to the IP network for example via a network interface card (not shown in the Figure). The hosts may also be for example Personal Computers (PC), work station computers or network server computers. Hosts A and B comprise a Master Controlling Unit (MCU) controlling the host and a memory MEM. The MCU can be for example a microprocessor. Hosts A and B also comprise an external interface 808, 818 through which they send the QoS measurement results to the QM and which the QM uses to configure the hosts to operate according to the measurement profile. Blocks 801-805 and 811-815 are operational blocks in which the MCU is arranged to perform specific operations on the basis of the software stored into the memory MEM of the host. In block 801, host A stores into the header of the IP test packet to be sent the sequence number SA and, just before the transmission, the time stamp TA based on host A's clock CLK. Host A also stores, in block 801, the tuple (RA, SB, TB) that is first in line for transmission in the (transmit) buffer 803 into the payload of the IP test packet to be sent. Also in block 801, host A stores into its memory MEM the values of the parameters SA and TA for the QoS analysis. In block 802 host A sends the IP test packet to host B.

In block 814 host B receives the IP test packet, sent by host A, at an instant of time RB shown by host B's clock CLK. In block 815 host B stores the values of parameters SA and TA included in the header of the IP packet it has received, the values of parameters RA, SB and TB included in the payload, and the value of parameter RB for the QoS analysis. Parameters RB, SA and TA host B stores into the (transmit) buffer 813. In block 811 host B stores a new sequence number SB into the header of the IP test packet to be transmitted and, just before the transmission, it stores a new time stamp TB according to host B's clock CLK into the header. Also in block 811 host B stores the tuple (RB, SA, TA) that is first in line for transmission in the (transmit) buffer into the payload of the IP test packet to be transmitted. Still in block 811, host B stores into its memory MEM the new values of parameters SB and TB for the QoS analysis. In block 812 host B sends the IP test packet to host A.

In block 804 host A receives the IP test packet, sent by host B, at an instant of time RA shown by host A's clock CLK. In block 805 host A stores the values of parameters SB and TB included in the header of the IP test packet it has received, the values of parameters RB, SA and TA included in the payload, and the value of parameter RA for the QoS analysis. Parameters RA, SB and TB are stored by host A into the (transmit) buffer 803.

In practice the memory MEM of the hosts comprises a memory area into which the MCU typically stores the contents of each IP test packet to be transmitted. Hence, when the IP test packet is transmitted, the content of this specific memory area is sent to the reception end. Said memory area is represented for example by the above mentioned buffer 803, 813.

In hosts A and B the MCU calculates the QoS parameter values according to the measurement profile stored into the memory MEM of the hosts and delivers the results to the QM over the external interface 808, 818.

Figure 9:
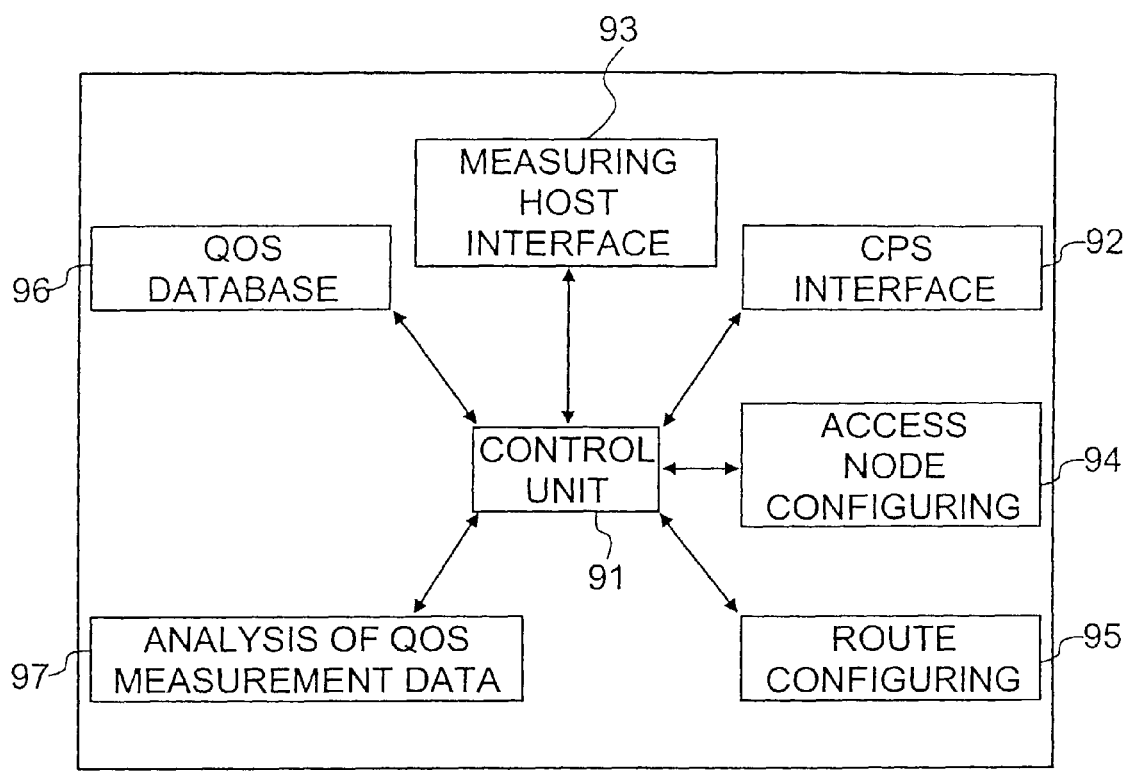
FIG. 9 is a block diagram illustrating a QoS manager unit QM according to the invention.

The block diagram in FIG. 9 illustrates the QoS manager QM according to the invention. The QM may be for example computer software that can be connected to the IP network 10 through a network interface card (not shown in the Figure), for example. The computer in question may be for example a PC, a workstation computer or a network server computer. The operation of the QM is controlled by a control unit 91 which may be for example a microprocessor in a PC. The QM comprises CPS interface 92, measuring host interface 93, access node configuring block 94, route configuring block 95, QoS database 96, and QoS measurement results analysis block 97. The QM uses the CPS interface 92 to communicate with the CPS and the measuring host interface 93 to communicate with measuring hosts A, C, B and D. In the QoS database 96 the QM maintains the application-level QoS measurement results it obtains from the measuring hosts. In the QoS measurement results analysis block 97 the OM analyses the network's QoS resources for example in a situation where the CPS has received a request for setting up a new real-time connection. The access node configuring block 94 performs the tasks for changing the traffic shaper parameters of the access node. The route configuring block 95, in turn, defines a route for a real-time connection, such as an IP call (or a multimedia aver IP call) and configures the IP core network routers.

The essential elements of the invention can thus be implemented by means of software. The computer software products stored into the memories MEM of the hosts and into the QM can be programmed using a suitable programming language, such as C programming language.

The invention enables efficient management and balancing of the QoS resources of the IP network in VoIP use when the network carries both best-effort traffic and real-time traffic at the same time. According to the invention, it is possible to adjust the QoS of the network in such a way that a QoS close to the desired QoS is maintained for the real-time traffic and real-time application and, at the same time, a minimum bandwidth is guaranteed to the best-effort traffic at the edges of the network to keep the traffic alive.

The invention is not dependent on the QoS technique employed in the IP network (such as the DiffServ), although the use of MPLS, for example, does provide more efficient management tools. To a certain extent, the invention is applicable to the management of the best-effort data traffic alone, for example for routing IP packets of the best-effort traffic.

The invention can be used within a single IP network domain irrespective of the surrounding networks. The invention thus offers efficient QoS management within an individual IP network domain, independent of other networks. If the route from one terminal to another goes through several network domains, the end-to-end QoS is determined by the QoS level that the other network domains along the route are capable to offer. Naturally the QoS management method according to the invention can also be applied in these network domains.

The implementation of the invention and its embodiments have been described above with reference to examples. A person skilled in the art will find it apparent that the invention is not restricted to the details of the above-described embodiments but the invention can be implemented in a variety of ways without deviating from the characteristics of the invention. The embodiments are intended to illustrate but not to restrict the present invention. Thus the implementations and uses of the invention are only restricted by the attached claims. Consequently various alternative implementations of the invention defined in the claims, as well as any equivalent implementations, are within the scope of the invention.

The invention claimed is:

1. A method, comprising:
feeding, by a measuring host at an access node of a network, a particular information flow into a packet network for purpose of measurement;
measuring, at the measuring host at the access node of the network, characteristics of said information flow in a continual measurement for producing quality of service information, wherein the access node interfaces the network to at least one user terminal; and
controlling communications traffic in the packet network on a basis of said quality of service information in order to manage a quality of service in the packet network, wherein the packet network comprises at least two access nodes through which communications traffic is relayed to and from said packet network, and a plurality of communications traffic routes between said access nodes, wherein at least one of the at least two access nodes includes the measuring host,
wherein said continual measurement is carried out on a route that goes through said access nodes,
wherein said controlling of communication traffic is performed by controlling said plurality of communications traffic routes,
wherein the packet network further comprises a quality of service manager, and wherein said continual measurement is performed according to a measurement profile configured in advance at the measuring host by the quality of service manager, the measurement profile includes quality of service parameters including at least one of a delay measurement, a jitter measurement, a packet loss measurement, a packet loss correlation measurement, and a bandwidth measurement, wherein one or more results of the continual measurement performed by the measuring host are delivered to the quality of service manager.

2. The method according to claim 1, wherein said communication traffic comprises voice over internet protocol packet traffic, wherein said information flow emulates a information flow produced by a real codec.

3. The method according to claim 1, further comprising:
maintaining a quality of service experienced the real-time traffic of said packet network on a predetermined level, wherein said packet network carries both real time traffic and best effort traffic.

4. The method according to claim 3, further comprising:
guaranteeing a minimum bandwidth for the best-effort traffic.

5. The method according to claim 3, wherein a deterioration of a quality of service situation in the packet network is detected on a basis of said measurement and that in response to the deterioration of the quality of service situation, action is taken to improve the quality of service experienced by the real-time traffic.

6. The method according to claim 5, wherein said action involves restricting a bandwidth of the best-effort traffic in order to maintain the quality of service experienced by the real-time traffic at the predetermined level.

7. The method according to claim 1, wherein communications traffic in said packet network is controlled by controlling an amount of communications traffic entering the network on a basis of said quality of service information.

8. The method according to claim 7, wherein both real-time traffic and best-effort traffic enter said packet network and that an amount of communications traffic entering said packet network is controlled by controlling an amount of the best-effort traffic on a basis of said quality of service information.

9. The method according to claim 1, wherein the results of said continual measurement are transmitted to the quality of service manager,
wherein the quality of service manager is configured to store said results into a memory as quality of service information, and wherein the quality of service manager is configured to control an amount of best-effort traffic coming to said packet network by controlling in a central manner at least one of said access nodes on the basis of the quality of service information.

10. The method according to claim 1, wherein a connection set-up request is received in the packet network and the connection set-up request is accepted or rejected on the basis of the quality of service information.

11. The method according to claim 10, wherein the connection set-up request is accepted on the basis of said quality of service information and a route is assigned for a connection on the basis of the quality of service information.

12. The method according to claim 1, wherein said plurality of traffic routes is controlled using a multi protocol label switching technique.

13. The method according to claim 1,
wherein between a predetermined first access node and a second access node there are a particular first route and a particular second route,
wherein said first route carries both real-time traffic and best-effort traffic, and
wherein on the basis of said quality of service information at least some of the best-effort traffic is re-routed to the second route between said first access node and said second access node in order to balance the quality of service in the packet network and to maintain a quality of service experienced by the real-time traffic at a predetermined level.

14. The method according to claim 1, wherein said packet network is an internet protocol-based packet network.

15. A system, comprising:
a packet network which comprises
at least two access nodes through which communications traffic is relayed to and from said packet network,
a plurality of communications traffic routes between said access nodes,
a transferring unit configured to transfer information in a packet format,
and
a quality of service manager;
a feeding unit, at one of the at least two access nodes, configured to feed a particular information flow into the packet network for purpose of measurement;
a measuring unit, at the one of the at least two access nodes, configured to measure characteristics of said information flow by using a continual measurement for producing quality of service information, wherein the access node interfaces the network to at least one user terminal; and
a controller configured to control communications traffic in a packet network on the basis of said quality of service information to manage a quality of service of the packet network,
wherein said measuring unit is configured to carry out the continual measurement on a route that goes through said access nodes,
wherein said controller is configured to perform said controlling of communications traffic by controlling said plurality of communications traffic routes, and
wherein said measurement unit is configured to perform the continual measurement according to a measurement profile configured in advance at the measuring unit by the quality of service manager, the measurement profile includes quality of service parameters including at least one of a delay measurement, a jitter measurement, a packet loss measurement, a packet loss correlation measurement, and a bandwidth measurement, wherein one or more results of the continual measurement performed by the measuring unit are delivered to the quality of service manager.

16. The system according to claim 15, wherein the predetermined information flow is an information flow emulating an information flow produced by a real codec.

17. The system according to claim 15, further comprising:
a transfer unit configured to transfer said quality of service information from the measuring unit to the quality of service manager.

18. An apparatus, comprising:
a feeding unit, at one of two access nodes, configured to feed a particular information flow into a packet network for purpose of measurement;
a measuring unit, at the one of the two access nodes, configured to measure characteristics of said information flow by using a continual measurement for producing quality of service information, wherein the at least one access node interfaces the network to at least one user terminal; and
a controller configured to control communications traffic in the packet network on the basis of said quality of service information to manage a quality of service of the packet network,
wherein said measuring unit is configured to carry out the continual measurement on a route that goes through at least two access nodes of said packet network,
wherein said controller is configured to perform said controlling of communications traffic by controlling a plurality of communications traffic routes between said access nodes, and
wherein said measuring unit is configured to perform the continual measurement according to a measurement profile configured in advance at the measuring unit by a quality of service manager, the measurement profile includes quality of service parameters including at least one of a delay measurement, a jitter measurement, a packet loss measurement, a packet loss correlation measurement, and a bandwidth measurement, wherein one or more results of the continual measurement performed by the measuring unit are delivered to the quality of service manager.

19. The apparatus according to claim 18, wherein the predetermined information flow is an information flow emulating an information flow produced by a real codec.

20. The apparatus according to claim 18, further comprising:
a transfer unit configured to transfer said quality of service information from the measuring unit to a quality of service manager.

21. An apparatus, comprising
means, at one of two access nodes, for feeding a particular information flow into a packet network for purpose of measurement;
measuring means, at the one of the two access nodes, for measuring characteristics of said information flow by using a continual measurement for producing quality of service information, for carrying out the continual measurement on a route that goes through at least two access nodes of said packet network, and for performing the continual measurement according to a measurement profile configured in advance at the measurement means by a quality of service manager, the measurement profile includes quality of service parameters including at least one of a delay measurement, a jitter measurement, a packet loss measurement, a packet loss correlation measurement, and a bandwidth measurement, wherein one or more results of the continual measurement performed by the measuring means are delivered to the quality of service manager; and
means for controlling communications traffic in the packet network on the basis of said quality of service information to manage the quality of service of the packet network and for controlling a plurality of communications traffic routes between said access nodes.

22. A computer program embodied on a computer readable medium for controlling a processor to implement a method, the method comprising:

feeding, by a measuring host at an access node of a network, a particular information flow into a packet network for purpose of measurement;

measuring, at the measuring host, characteristics of said information flow in a continual measurement for producing quality of service information, wherein the access node interfaces the network to at least one user terminal; and controlling communications traffic in the packet network on a basis of said quality of service information in order to manage a quality of service in the packet network, wherein the packet network comprises at least two access nodes through which communications traffic is relayed to and from said packet network, and a plurality of communications traffic routes between said access nodes, wherein said continual measurement is carried out on a route that goes through said access nodes, wherein said controlling of communication traffic is performed by controlling said plurality of communications traffic routes, wherein the packet network further comprises a quality of service manager, and wherein said continual measurement is performed according to a measurement profile configured in advance at the measuring host by the quality of service manager.

* * * * *